N. W. SPAULDING.
SAW-TEETH.
No. 192,090.        Patented June 19, 1877.
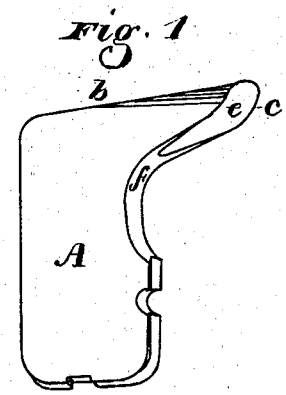
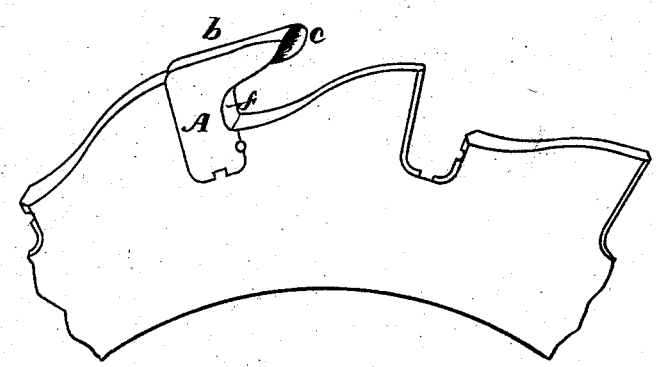
Witnesses
Geo. H. Strong.
Jno. L. Boone
Inventor
Nathan W. Spaulding
by Dewey & Co
Attys

UNITED STATES PATENT OFFICE.

NATHAN W. SPAULDING, OF OAKLAND, CALIFORNIA.

IMPROVEMENT IN SAW-TEETH.

Specification forming part of Letters Patent No. 192,090, dated June 19, 1877; application filed June 21, 1876.

*To all whom it may concern:*

Be it known that I, NATHAN W. SPAULDING, of Oakland, Alameda county, State of California, have invented an Improvement in Saw-Teeth; and I do hereby declare the following description and accompanying drawings are sufficient to enable any person skilled in the art or science to which it most nearly appertains to make and use my said invention without further invention or experiment.

My invention relates to certain improvements in the construction and manner of forming and sharpening the points or cutting-bits of circular-saw teeth.

The object of my improvement is to prevent the waste of lumber occasioned by the use of broad-pointed saw-teeth, and to accomplish this I have devised a novel bit or point, which, although but slightly broader than the thickness of the saw-blade, will clear both itself and the saw-blade as they pass through the wood, and at the same time allow the saw to run much easier than any other form of tooth-point.

My improvements can be applied to any style of tooth used in circular saws; but for convenience I have in the present instance represented it as applied to what is known as an "inserted tooth."

In the accompanying drawings, Figure 1 is a perspective view of a tooth. Fig. 2 shows a tooth in position in the saw-plate.

A represents a saw-tooth.

The top $b$ of the tooth I make straight or curved, according to the style of tooth required.

The front or cutting-edge $c$ of the tooth stands at an angle to a radial line drawn from the center of the saw-blade, the upper part of the cutting-point projecting beyond the lower part, as represented. The top of the tooth, near the tooth-point, I make convex for a short distance back of the point. The under side of the tooth I then make concave by forming a semicircular groove, $e$, commencing at the upper part of the point and extending downward and backward toward the throat $f$, thus forming an inverted U-shaped or curved cutting-point, the edge of which stands at an angle, so that the upper or convex part of the cutting-point is in advance of the side bits, while the cutting-points of the side bits gradually recede, so as to form inclined side bits, which enter and pass through the wood with a drawing cut.

I am aware that side bits or flanges have been heretofore applied to the cutting-points of saw-teeth; but they were applied at right angles to the main tooth-point, so as to form corners or angles, which it was impracticable to keep in order. The cutting-edges of the side bits or flanges were also arranged in the same plane with the cutting-edge of the main point, so that they cut squarely and simultaneously with it, thus practically forming two or more separate cutting-edges to be kept sharp; but it will be noticed that the entire cutting-edge of my tooth and side bits forms only a single cutting-edge, which recedes from the upper edge or top of the tooth toward the throat of the tooth.

One great advantage in this form of cutting-point is the great facility with which it can be sharpened when it becomes dulled, as a small emery-wheel, with a convex rim, can be applied to the concavity on the under side of the point, and in a very short time the cutting-edge can be perfectly and uniformly restored.

I thus combine a curved or rounded cutting-edge with inclined side bits, the whole forming one continuous cutting-edge without corners or angles. In practical operation this tooth-point will cut much easier than one having corners or angles, and therefore will admit of the saw being fed faster into the wood, so that it will perform more and better work; and, again, when a saw-tooth has sharp corners or angles the corners or angles are liable to become broken or dulled when the tooth comes in contact with knots or other hard substances in the wood, so as to cause the saw to dodge, or, in other words, to lead the saw off to one side, thus depreciating the quality of the lumber by sawing it in such a manner that it is of an unequal thickness.

My tooth-point has no such abrupt points or angles to be broken or dulled, and is therefore less liable to accident. It is also easier sharpened and kept in repair, and requires less skill to keep it in practical working order than ordinary saw-teeth, which have their points formed with angular or rectangular corners.

I do not claim the saw-tooth shown in the patent granted to J. M. Johnston, May 25, 1869, No. 90,365; but What I do claim is—

A channel-faced saw-tooth having its main cutting-point convexed so as to form a continuous or bonnet-shaped cutting-point, said point being formed on circular lines and inclined toward the throat $f$ of the tooth, substantially as described.

NATHAN W. SPAULDING.

Witnesses:
 JNO. L. BOONE,
 GEO. H. STRONG.